Nov. 24, 1970         R. H. MERCER         3,542,968
                      PAGING SYSTEM

Filed Feb. 16, 1968                    15 Sheets-Sheet 1

CONVENTIONAL TIMING DIAGRAM

PROPOSED TIMING DIAGRAM

*INVENTOR*
R.H. MERCER
AGENTS
*Curphey & Erickson*

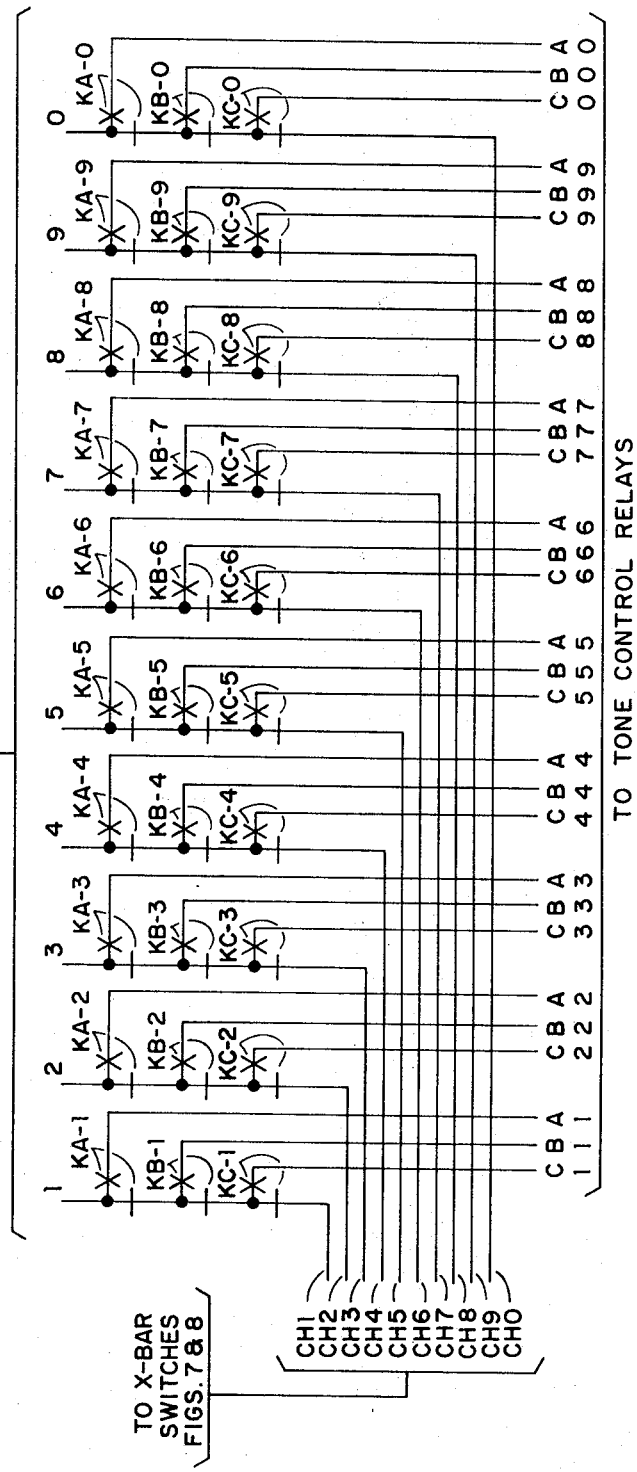
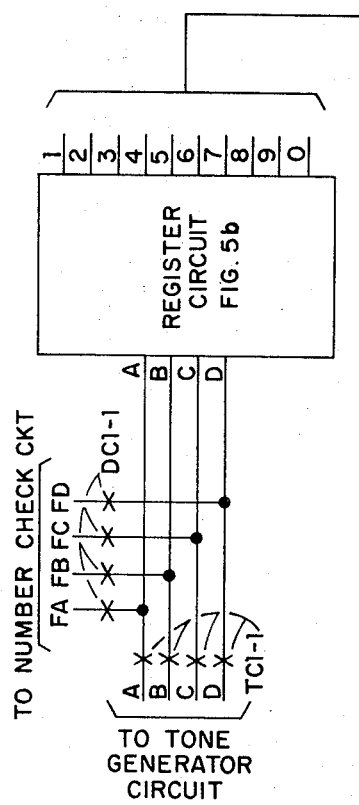

INVENTOR
R. H. MERCER

AGENTS
Curphey & Erickson

INVENTOR
R. H. MERCER
AGENTS
Curphey & Erickson

INVENTOR
R. H. MERCER

AGENTS
Curphey & Erickson

United States Patent Office 3,542,968
Patented Nov. 24, 1970

3,542,968
PAGING SYSTEM
Ronald H. Mercer, Saint Laurent, Quebec, Canada, assignor to The Bell Telephone Co. of Canada, Montreal, Quebec, Canada
Filed Feb. 16, 1968, Ser. No. 705,954
Int. Cl. H04m 11/02
U.S. Cl. 179—41
16 Claims

ABSTRACT OF THE DISCLOSURE

The paging system, in accordance with the invention, comprises a plurality of trunk circuits for receiving the dial pulses originating from various groups of subscribers and a like number of register circuits connected to the trunk circuits for storing the pulses. A preference circuit is connected to the trunk circuit and comprises a first rotary switch adapted to hunt for any trunk having a complete number stored in it and to connect such trunk to a number checking circuit which determines in which group the number stored in such trunk belongs. The preference circuit also includes a second rotary switch having as many banks as there are groups of calling subscribers, each bank being adapted to select one trunk from each group. A common control circuit energizes the preference circuit to hunt for a trunk having a complete number stored in it and to select one trunk from each group of calling subscribers. The common control circuit also keys a number of transmitters when a number contained in a register circuit has been checked by the number checking circuit and found to exist in one of the various groups of subscribers. In addition, the common control circuit turns on a tone generator circuit when all the transmitters are in operation. Various groups of tone control relays are adapted to be connected to the selected trunk register circuits and operated by the tone generator circuit to convert the dial pulses stored in the register circuit of each selected trunk circuit to corresponding audio tones. The groups of tone control relays are operated successively by the tone generator circuit to transmit each group of audio tones in successive order.

---

This invention relates to personal paging systems.

A paging system is a one-way communication system from a central location to a person at a remote location. Public address systems have been available for many years but they are limited in range and privacy. Recently, a new concept in paging systems has been developed. Using a radio transmitter, a frequency coded signal is transmitted to one or more receivers each one being tuned to a predetermined frequency. Each person carrying a receiver responds to the receipt of his code by performing a pre-arranged function, such as reporting back to his office.

With this basic concept in mind, many variations of radio paging systems have been developed. For example, one of these systems has been particularly adapted for in-plant paging systems. The in-plant paging system consists essentially of a transmitter and a number of receivers, each of which is assigned a three digit number. When a particular person is required, his code is set up manually, by an operator, on a tone encoder. This device translates each digit of the number into corresponding audio tones. A radio transmitter is keyed, and the audio tones sequentially modulate the carrier signal of the transmitter. This signal is broadcast to all receivers in the plant. Each receiver is equipped with a tone decoder which responds only to the proper sequence of radio tones. When this sequences is detected, an audio oscillator in the receiver is triggered on and an audible signal indicates to the bearer of the receiver that he is being signalled. Also, instead of an audible tone being triggered in the receiver, when the code is received, a light could flash or a combination of lights and tone could be incorporated into one receiver.

Another paging system has been developed for a city-wide audience. The philosophy of the system is the same as the above-mentioned in-plant system. However, due to the increased capacity and coverage that was required, a major change in equipment and design was necessary. The city-wide paging system is designed to operate over the regular telephone equipment. A subscriber may be reached by dialing a special central office number assigned to the paging system, for example, 251, and a four digit number, for example 1234. The call is routed to the special central office which stores the last four digits in one of a plurality of storage registers until ready for transmission. As the calls enter the registers, a preference circuit selects the numbers in the dialed-in sequence. The register containing the subscriber's number is eventually emptied and the number is transferred to an encoding device which translates it into the proper tones. These tones are then sent to one or more radio transmitters for transmission throughout the city. The proper receiver carried by the city-wide paging system customer responds to the coded signals and emits an audio signal. The subscriber who is carrying that receiver is thus alerted to call his office.

It has been found in practice that the above system using a reasonable number of registers, encoders and transmitters can only provide good service to about 1500 subscribers. The number of subscribers on the system is determined by the number of accessible lines to the paging system terminals, the number of storage registers, the total storage time and waiting time for a call to be processed and by the number of users at peak usage periods.

However, the theoretical maximum number of subscribers that the system can accommodate is limited purely by the combination of four digits in a suitable decoder which number has been found to be about 5760 codes with the receivers available on the market.

One method of increasing the number of codes that has been proposed was to increase the number of storage registers, encoders and transmitters. This idea was considered impractical because of the prohibitive cost of setting up the new equipment. Another major disadvantage was that this would necessitate the addition of more channels and this was likely to cause intermodulation problems. Since reliability is a major requirement of the paging system, intermodulation problems must not exist.

The above difficulties were overcome by a paging system which uses about the same amount of equipment as the original system and operates on only one channel thereby conserving spectrum space. The novel system is based on the idea of trying to squeeze more calls into the pause between transmissions. In the original system, each burst of transmission lasted 1.4 seconds and there was a pause of 2.5 seconds between transmissions. It is proposed to increase the pause between transmissions of the same code to 3.0 seconds and to transmit two other groups of tones or calls in the pause with a slight pause between calls. With such a short pause, however, it is not possible to use identical tones for each group of calls. Consider a call such as 1461 being transmitted right after a call such as 1264. If the two calls have identical tones then it would be possible that receivers responding to codes 2641, 6414, and 4146 be triggered by the two calls. Therefore, the three groups of calls have to have different coded tones.

To satisfy the above requirements, each number assigned to a subscriber is labelled A, B, or C depending on the group assigned to the subscriber. Each digit within a group is assigned a predetermined tone. In addition, corresponding digits in different groups are assigned different tones.

The paging system, in accordance with the invention, comprises a plurality of trunk circuits for receiving the dial pulses designated for various groups of subscribers and a like number of register circuits connected to the trunk circuits for storing the pulses. A preference circuit is connected to the trunk circuit and comprises a first rotary switch adapted to hunt for any trunk having a complete number stored in it and to connect such trunk to a number checking circuit which determines in which group the number stored in such trunk belongs. The preference circuit also includes a second rotary switch having as many banks as there are groups of called subscribers, each bank being adapted to select one trunk from each group. A common control circuit energizes the preference circuit to hunt for a trunk having a complete number stored in it and to select one trunk from each group of called subscribers. The common control circuit also keys a number of transmitters when a number contained in a register circuit has been checked by the number checking circuit and found to exist in one of the various groups of subscribers. In addition, the common control circuit turns on a tone generator circuit when all the transmitters are in operation. Various groups of tone control relays are adapted to be connected to the selected trunk register circuits and operated by the tone generator circuit to convert the dial pulses stored in the register circuit of each selected trunk circuit to corresponding audio tones. The groups of tone control relays are operated successively by the tone generator circuit to transmit each group of audio tones in successive order.

It is also a main feature of the invention to provide a number checking circuit for determining in which group a four digit number stored in a register circuit belongs. The number checking circuit comprises a first and a second crossbar switch each having vertical and horizontal magnets. The vertical and horizontal magnets of the first switch are operated in accordance with the first and the second digits respectively of the number stored. Similarly, the vertical and horizontal magnets of the second switch are operated in accordance with the third and fourth digit of the number stored. Predetermined crosspoints of the first and second switch are connected in series with predetermined relays in accordance with the number and groups assigned to each subscriber whereby the energization of a predetermined one of the relays will determine the group of the called subscriber.

The invention will now be described with reference to the accompanying drawings in which.

Figure 1:
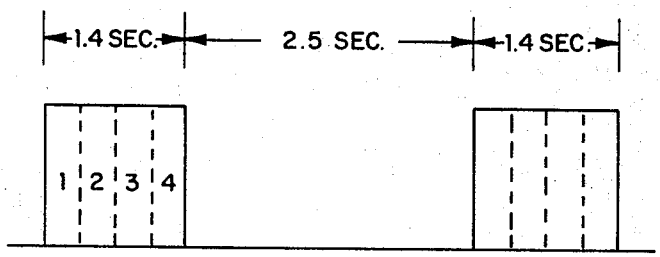
FIG. 1 illustrates a timing diagram in accordance with the prior art.
Figure 2:
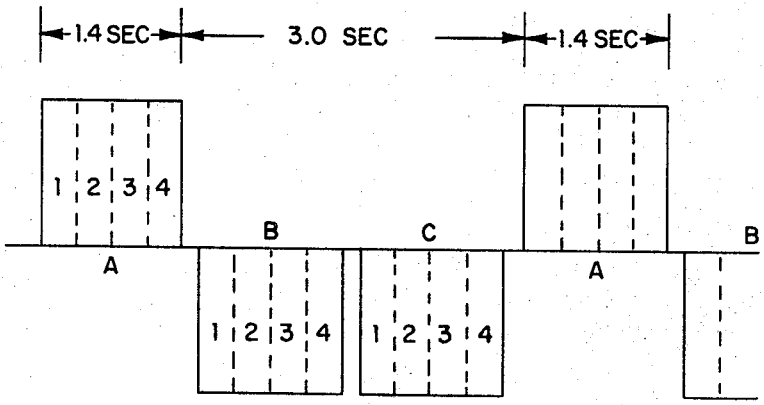
FIG. 2 illustrates a timing diagram in accordance with the invention.

As illustrated in FIG. 1, each call of the original system was repeated and had a 1.4 second burst of transmission followed by a 2.5 second pause. In order to increase the capacity of the system, a timing diagram such as illustrated in FIG. 2 is proposed. In such a diagram, the 2.5 second pause is increased to 3.0 seconds and two more calls having 1.4 second bursts of transmission are fit in with a slight pause of say 0.1 second between calls. It is to be understood, however, that the values mentioned above are only illustrative and that other values could be substituted. The diagram of FIG. 2 is not to be taken in a limited sense only as far as it illustrates the idea of squeezing other calls into the pause between subsequent transmissions of the same call.

Each subscriber wishing to have the paging service is given a four digit number as well as a group number which, in the present disclosed embodiment, will be A, B, or C. As mentioned previously, each group has different coded tones so as to distinguish from the other groups. For example, digit 1 in group A does not have the same tone as digit 1 in group B. In addition, each digit in the same group is assigned a different tone as it is done in the existing paging systems.

Figure 3:
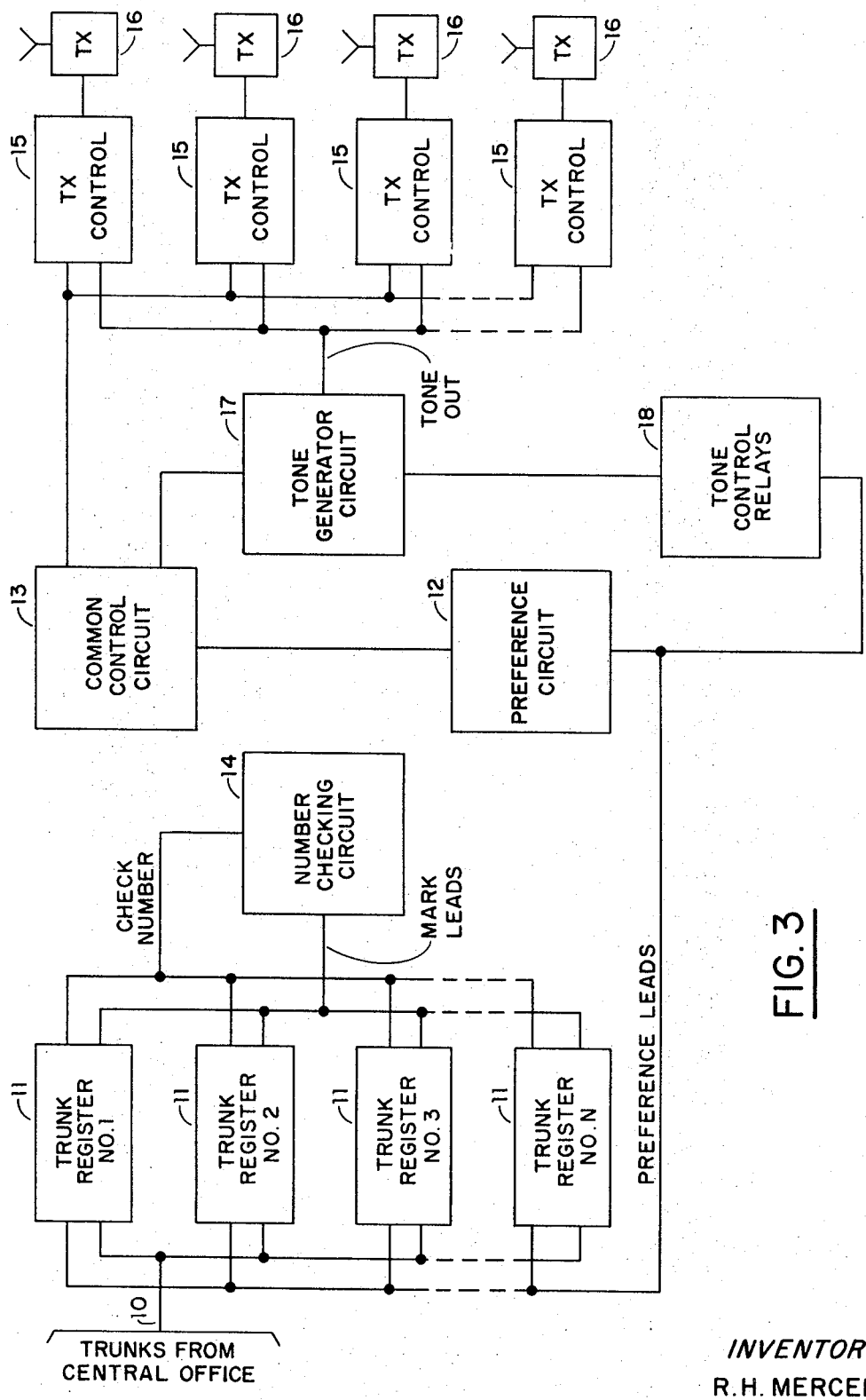
FIG. 3 illustrates a block diagram of the paging system in accordance with the invention.

The paging system, in accordance with the invention, is shown in block diagram form in FIG. 3. When someone dials the access code, i.e. 251, his line is automatically routed through the Central Office (not shown) to the paging system terminals along special lines called trunk lines 10. The trunk lines 10 are connected to a number of trunk registers 11. Each trunk register 11 accepts the last four dial pulses from the calling subscriber and stores them.

When any trunk register circuit 11 has a complete number stored in it, a preference circuit 12 is energized by a common control circuit 13 to find such trunk and to connect it to a number checking circuit 14. The number checking circuit 14 examines the number stored and determines in which group the dialed number belongs. The number checking circuit 14 then "marks" the trunk register 11 with a different mark depending on whether the stored number is from the A, B, or C group. If the dialed number has not been assigned to a subscriber then it is rejected and the trunk register is emptied. If the number is valid, the trunk register 11 accepts the marking pulse from the number checking circuit.

The preference circuit 12 is subsequently operated by the common control circuit 13 to select one trunk from each group of called subscribers as determined by the number checking circuit 14.

As soon as a call has been examined by the number checking circuit 14 and found to exist in one of the groups of called subscribers, the common control circuit 13 keys a number of transmitter control circuit 15 connected to transmitters 16. When the transmitters are ready to operate, the transmitter control circuit signal the common control circuit 13 to operate a tone generator circuit 17. Tone generator 17 operates various groups of tone control relays 18 in sequence to convert the information stored in the trunk circuits selected by the preference circuit 12 to corresponding audio tones for transmission by the radio transmitters 16.

The tones are then relayed from the tone generator 17 to the transmitter controls 15 which send the tones along telephone lines to all the transmitters in the network. Then they are broadcast simultaneously throughout the city.

The invention will now be described in detail with reference to FIGS. 4 through 14. The description is divided into various sections referring to the pertinent drawings.

Figure 4B:
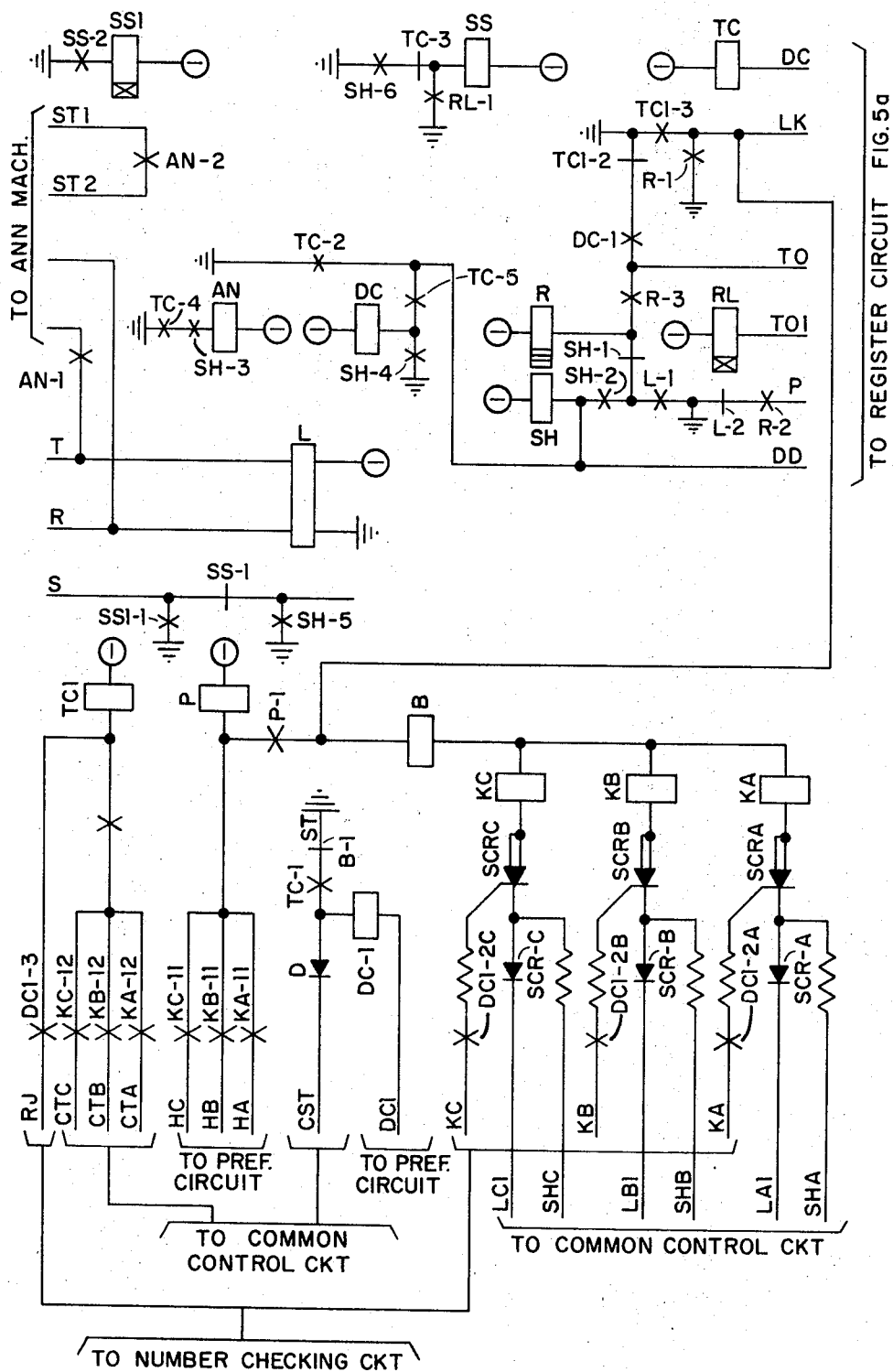
FIG. 4 illustrates the circuit of the trunk circuit of the paging system.

INCOMING TRUNK REGISTER CIRCUIT (a) Trunk circuit—Section 1—FIG. 4

When a calling subscriber dials the three digit access code, connection is established to the T, R, & S leads of the trunk circuit. As commonly known in the art, the bridge from the subscriber set operates the line relay L. The line relay L operates the relay R through normally closed contacts SH–1 of relay SH and operated contacts L–1 of relay L. The operated relay R grounds the lock lead LK to the register circuit through contacts R–1 and closes the pulsing lead P to the same register circuit through contacts R–2 and contacts L–2 of relay L.

As the calling subscriber dials the four remaining digits of the subscriber being called, relay L releases on each pulse and grounds the lead P over contacts L–2 and R–2. This causes the four digits to be stored in the register. A detailed description of the register circuit is given in the following section entitled Register Circuit.

When all four digits have been registered lead DC and DD to the trunk circuit will be grounded by relays in the register circuit as it will be described in the following section. When such is done, the ground on the DC lead operates trunk circuit relay TC. Similarly, ground on the DD lead operates trunk circuit relay SH.

Relay TC, when operated, grounds lead ST through contacts TC–1 and normally closed contacts B–1 of a relay B to be described later. The ST ground is connected over the winding of relay DC1 to lead DC1 and through diode D to lead CST. The DC1 and the CST leads are connected to the Preference Circuit and the Common Control Circuit respectively described in the following sections. For the purpose of the description of the present section, let us say that the preference circuit will start hunting upon application of ground to the CST lead and find the trunk which is causing the CST lead to be grounded. Furthermore, the Preference Circuit will provide battery to operate relay DC1 of that trunk.

Relay SH when operated locks operated over contacts SH–2 and under control of relay L through contacts L–1. Relay SH also operates relay AN through contacts SH–3 and closed contacts TC–4, and relay DC through contacts SH–4. In addition, relay SH opens the operate path of relay R by opening contacts SH–1. Relay R remains operated, however, over its own contacts R–3, operated contacts DC–1 of relay and released contacts TC1–2 of trunk circuit relay TC1. Finally, relay SH grounds the sleeve lead S towards central office through contacts CH–5.

Relay AN when operated connects the announcement machine to the T and R leads through contacts AN–1 and connects the ST1 lead to the ST2 lead starting the announcement machine through contacts AN–2. The announcement machine provides a recorded message to the paging system subscriber to the effect that the called number has been stored and will be processed in due course.

Relay DC when operated locks operated under the control of contacts TC–2 of operated relay TC, and closes the locking path for relay R through contacts DC–1 and TC1–2 as mentioned previously.

The operation of relay DC1 closes contacts DC1–1 and connects the A, B, C & D leads of the register circuit (shown in block diagram in FIG. 4) to the FA, FB, FC & FD lead of the number checking circuit respectively. It also completes paths KA, KB or KC to the number checking circuit through contacts DC1–2A, DC1–2B or DC1–2C. The number checking circuit is described fully in Section 3. For the purpose of the description of this section, let us say that the number checking circuit will determine into which group (A, B or C) the particular number which has been stored in the trunk register under test belongs. Governed by this finding, the number checking circuit will place a momentary ground on leads KA, KB or KC.

The momentary ground placed on leads KA, KB or KC triggers silicon controlled switch SCRA, SCRB or SCRC through contacts DC1–2A, DC1–2B or DC1–2C, and operates the appropriate KA, KB or KC relay. Relays KA, KB and KC receive battery from leads LA1, LB1 and LC1 connected to the common control circuit which will be explained later. Relay B also operates in series with whichever of the three KA, KB or KC relays was selected. Because of the locking action of the SCR switches, such relays lock operated under the control of contacts R–1 of relay R. The operation of relay B opens contacts B–1 and opens the ST lead to the CST diode and the DC1 relay.

The release of the relay DC1 disconnects the trunk from the number checking circuit and renders the number checking circuit free to check other trunk circuits which have a complete four digit number stored if any such trunks exist.

The energization of relay KA, KB or KC operates contacts KA(1–0), KB(1–0) or (KC(1–0) and directs the register circuit output to the correct group (A, B or C) of tone control relays. The operation of relay KA, KB or KC also connects the winding of relay P to HA, HB or HC lead of the Preference Circuit through KA–11, KB–11 or KC–11. As will be described later, when an appropriate space becomes available, the preference circuit will apply ground on lead HA, HB or HC. Relay P will operate and lock operated to the ground on lead LK from closed contacts R–1 of relay R and its own contacts P–1. Relay P and relay KA, KB or KC will also connect the winding of the TC1 relay to the CTA, CTB or CTC lead to the common control circuit through contacts P–2 and KA–12, KB–12 or KC–12, respectively.

When the common control system is ready to transmit the group of codes involved (A, B or C) ground will be supplied to the CTA, CTB or CTC lead as will be explained later. The ground on CTA, CTB or CTC will operate trunk circuit relay TC1. The operation of relay TC1 closes the A, B, C and D leads through to the tone generator circuit in closing contacts TC–1. The operation of relay TC1 opens contacts TC1–2 and releases relay R. In addition, it supplies locking ground to lead LK at contacts TC1–3 in place of that supplied by contacts R–1 of relay R.

The release of relay R opens the pulsing lead P to the register circuit at contacts R–2. In addition, it removes ground from the LK lead. This removal has no effect at this time, however, since ground is also supplied by operated relay TC1 at contacts TC1–3.

When the code has been transmitted the correct number of times, the common control circuit will remove the ground on lead CTA, CTB or CTC thus causing the TC1 relay to release. The release of relay TC1 will open the lead LK at contacts TC1–3 and restore all register circuit relays and relay P of that trunk.

The release of the register circuit relays will remove ground from leads DC and release relay TC. It will also remove ground from lead DD and release relay SH unless the calling subscriber has not hung up. If the calling subscriber has not hung up, the release of relay TC will operate relay SS through released contacts TC–3 and operate contacts SH–6.

The operation of relay SS opens contacts SS–1 removing ground from the sleeve lead S. It also operates relay SS1 which is slow to operate through contacts SS–2. The operation of relay SS1 places ground on the sleeve lead through contacts SS1–1. The operation of the SS relay and the SS1 relay provides a "wink" action on the sleeve lead which will release the calling subscriber from the circuit. The ground will be held on the sleeve lead after the "wink" until all trunk circuit relays have released as follows:

The release of relay TC opens contacts TC–4 and releases relay AN. In addition, the release of relay TC opens contacts TC–2 and TC–5 and releases relay DC if relay SH is released.

When the T and R leads are opened from the central office (calling party hung up), the relay L will release in the usual fashion. The release of relay L opens contacts L–1 and releases relay SH. The release of relay SH opens contacts SH–4 and releases relay DC (if relay TC is released). The release of relay SH also opens contacts SH–6 and releases relay SS. The release of relay SS opens contacts SS–2 and releases SS1. The release of relay SS1 removes ground form sleeve lead S and allows the trunk circuit to be seized by another calling party.

There are conditions under which subscribers are disconnected from the trunk circuit, such conditions being as follows:

(A) *If subscriber disconnects before the code has been transmitted.*—The above sequence of operation of relay SS and SS1 applies when the L relay is released by subscriber disconnect.

(B) *If subscriber fails to dial after seizing trunk.*—The relay L is operated closing contacts L–1 and operating relay R. The operation of relay R supplies ground for timeout relay RL through closed contacts RA–3, FIG. 5 (to be described later), R–3, SH–1 and L–1. After a timeout of 30 seconds the RL relay operates. The operation of relay RL closed contacts RL–1 and starts the SS and SS1 relay sequence described above to provide a "wink" condition on the sleeve. The calling subscriber is disconnected releasing the L relay. The release of relay L releases the R relay which releases the RL relay through contacts R–3. The release of relay RL releases relays SS. The release of relay SS releases SS1 as above and causes the trunk circuit to be released.

(C) *If subscriber dials one to three digits.*—A timeout feature will operate under control of a relay RA in the register circuit. The relay RA operates while each digit is dialed so that if a subscriber hesitates too long between digits, contacts RA–3, FIG. 5 will be closed long enough to operate relay RL and a disconnect will follow as indicated in (B).

If a number stored in the register circuit is found *not* to exist in the number checking circuit, a momentary ground will be placed by the number checking circuit (to be described later) on lead RJ. The ground on the RJ lead operates relay TC1 through contacts DC1–3 of relay DC1. The operation of relay TC1 will release relay R by opening contacts TC1–2. It will also ground the lead LK at contacts TC1–3 thus holding all relays which were previously held by relay R. When the RJ ground is removed, relay TC1 will release opening contacts DC1–3 and ground will be removed from lead LK at contacts TC1–3 thus releasing all relays in the trunk and register circuit and returning the trunk circuit to an idle condition.

Figure 5A:
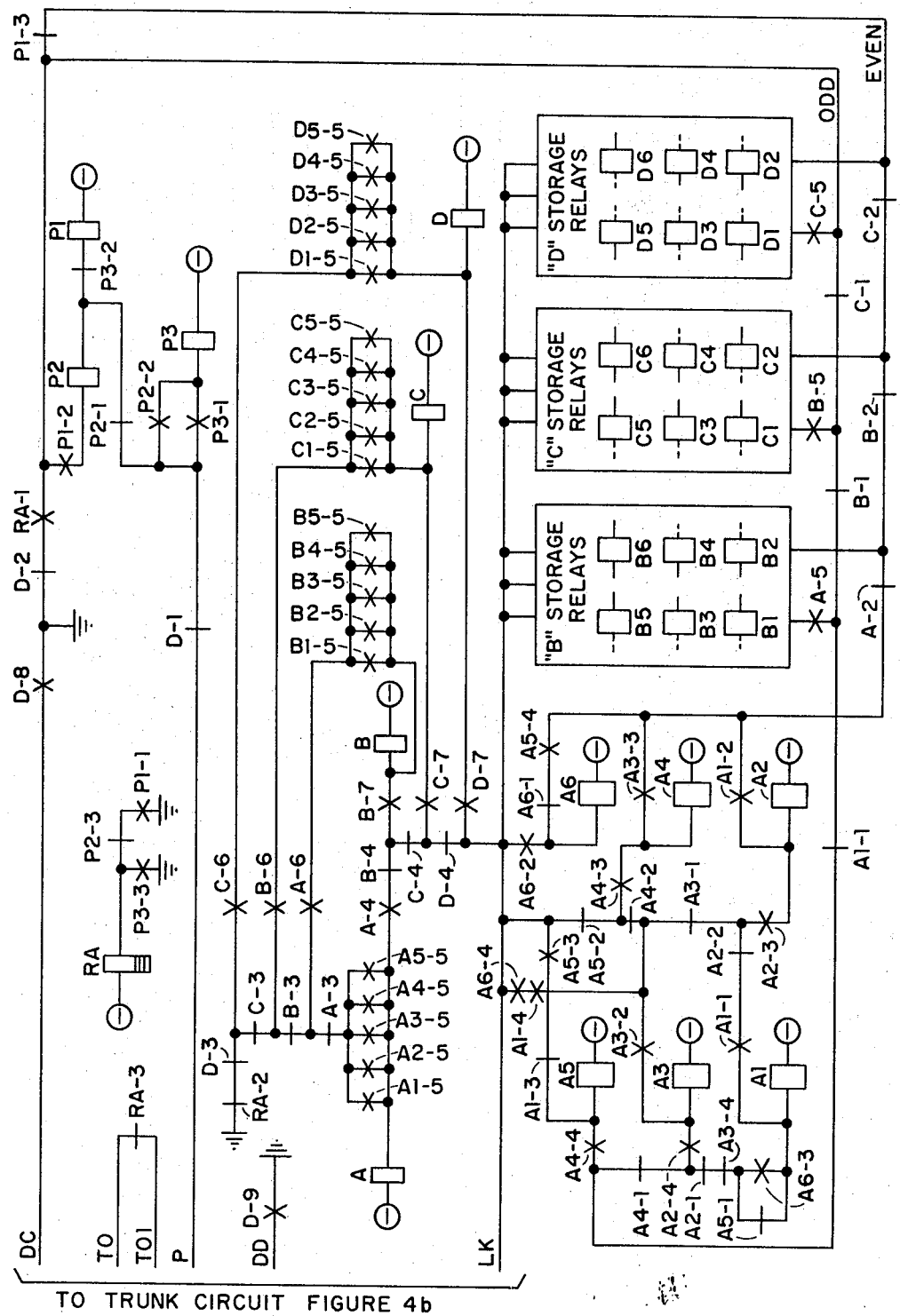
FIG. 5 illustrates the register circuits.
Figure 5B:
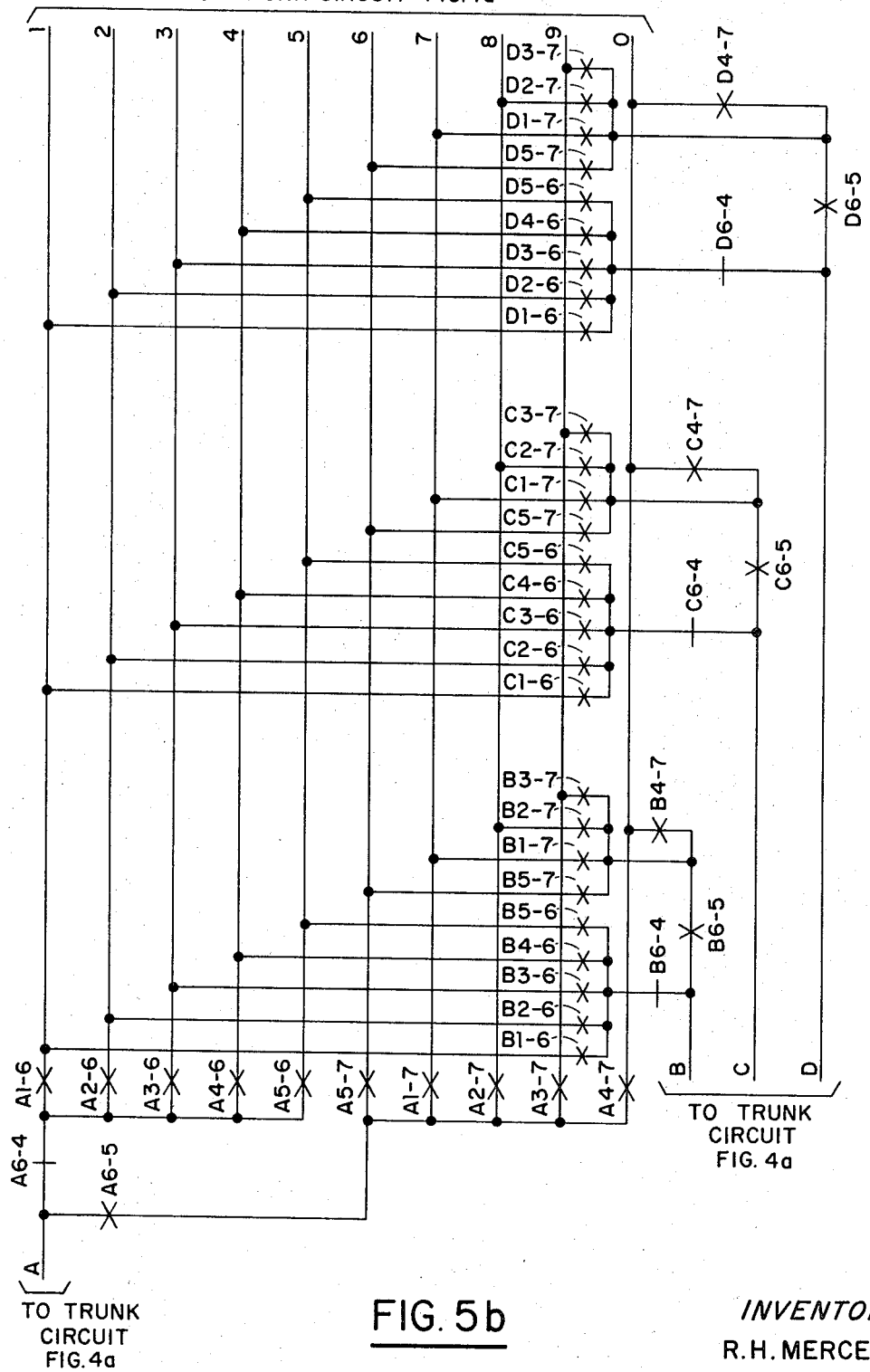

(b) Register Circuit—Section 2—FIG. 5

When the pulsing relay L in the trunk circuit operates, the relay R in the trunk circuit operates. The R relay operated grounds the LK lead and grounds the sleeve lead S of the trunk as mentioned previously. In addition, it provides a path between contacts L–2 of the L relay and the P lead. The R relay is slow to release and does not release during pulsing.

For each pulse, the pulsing relay in the trunk circuit releases and momentarily grounds the P lead. The first pulse operates a relay P1 through normally closed contacts D–1, P2–1 and P3–2. The operation of relay P1 closes contacts P1–1 and operates a register advance relay RA. In addition, relay P1, through its own contacts P1–2, contacts RA–1 of relay RA and normally closed contacts D–2 closes a locking path for itself in series with the winding of a relay P2.

Relay P2 remains short circuited by the ground on the P lead. At the end of the pulse when this ground is removed, relay P2 is operated. The second pulse operates relay P3 through contacts P2–2 of relay P2. Relay P3 locks operated through its own contacts P3–1, and releases relays P1 and P2 by opening its contacts P3–2. At the end of the pulse relay P3 releases. The next pulse starts a repeat of this cycle. Thus, at the end of an odd number of pulses the P1 and the P2 relays remain operated. At the end of an even number of pulses, the P1, P2, and P3 relays are all released.

The operation of relay P1, as mentioned previously, operates a path for relay RA at contacts P1–1. This path is opened at the end of the first pulse by the operation of relay P2 which opens its contacts P2–3. Relay P3 closes the operate path of relay RA at contacts P3–3 during the second digit. Thus, the operate path for the RA relay is closed during a pulse, and opened between pulses. Relay RA is slow releasing and remains operated between the pulses of each digit, but releases between digits.

With register advance relay RA operated, ground is supplied to contacts P1–3 to operate the storage relays A1 to A6. The first operation of relay P1 grounds the ODD lead through contacts RA–1 and normally closed contacts D–2 of relay D to be described later. The first operation of relay P1 grounds the ODD lead to operate relay A1 through closed contacts A–1, B–1 and C–1 of steering relays A, B and C and closed contacts A4–1, A2–1, A3–4 and A5–1. Relay A1 locks operated through contacts A1–1, A2–2, A3–1, A4–2, A5–2 and ground on lead LK from the trunk circuit. The first release of relay P1 on the second pulse closes contacts P1–3 and grounds the EVEN lead operating relay A2 through contacts C–2, B–2, A–2, A1–2. Relay A–2 locks through contacts A2–3, A3–1, A4–2, A5–2 and ground on lead LK. In addition, the operation of relay A2 releases relay A1 at contacts A2–2. The second operation of relay P1 grounds the ODD lead to operate relay A–3 through now closed contacts A2–4. Relay A–3 locks itself to the LK ground through contacts A3–2. The second release of relay P1, on the second pulse, grounds the EVEN lead operating relay A4 through now closed contacts A3–3. Relay A4 locks itself through contacts A4–3. The operation of relay A4 also opens contacts A4–2 and releases A3. Subsequent pulses operate and release the storage relays as follows:

| Pulse | P1 relay | Lead ground | Storage relay operated |
|---|---|---|---|
| 1 | O | ODD | A–1 |
| 2 | N | EVEN | A–2 |
| 3 | O | ODD | A–3 |
| 4 | N | EVEN | A–4 |
| 5 | O | ODD | A–5 |
| 6 | N | EVEN | A–5, A–6 |
| 7 | O | ODD | A–1, A–6 |
| 8 | N | EVEN | A–2, A–6 |
| 9 | O | ODD | A–3, A–6 |
| 0 | N | EVEN | A–4, A–6 |

When any one of relay A1 through A5 is operated, contacts A1–5, A2–5, A3–5, A4–5, or A5–5 is closed and a path is completed over the released contacts RA–2 of relay RA and normally closed contacts D–3, C–3, B–3 and A–3 to steering relay A. When relay A is operated it locks operated to ground on lead LK through contacts A–4 and closed contacts B–4, C–4 and D–4 of steering relays B, C, and D. The operation of relay A opens contacts A–1 and A–2 and closes contacts A–5 to transfer the even and odd pulsing leads to the B group of storage relays.

The B group of storage relays functions the same as the A group described previously and when the RA relay releases after the last pulse of the second digit, steering relay B operates over contacts B1–5, B2–5, B3–5, B4–5 or B5–5 and closed contacts A–6, B–3, C–3, D–3 and RA–2. The operation of steering relay B releases relay A at contacts B4 and transfers the even and odd pulsing leads of the C group of storage relays by opening contacts B–1 and B–2 and closing contacts B–5. Relay B locks operated through contacts B–7, C–4, D–4 and ground lead LK.

The C group of storage relays operates the same as the A and B groups described previously and upon storing the last pulse of the third digit will cause steering relay C to operate. The operation of steering relay C releases relay B at contacts C–4 and transfers the even and odd pulsing leads to the D group of storage relays by opening contacts C–1 and C–2 and closing contacts C–5. Relay C locks operated through contacts C–7 and D–4 to ground lead LK.

The D group of storage relays operates the same as the A, B and C groups discussed previously. Upon storage of the last pulse of the fourth digit steering relay D will operate. The operation of steering relay D releases relay C at contacts D-4. Relay D locks operated to the LK lead through contacts D-7. The operation of relay D also disconnects the operate ground to the storage relay ground at contacts D-1, D-2 and D-3 so that any additional digits dialed does not affect the number which has been stored. In addition, the operation of relay D grounds the DC and DD lead at contacts D-8 and D-9 to operate relays TC and SH respectively in the trunk circuit.

The A1-A6, B1-B6, C1-C6 and D1-D6 storage relays connect the A, B, C and D leads respectively to one of leads 1 to 9 depending on the particular storage relays operated as covered in the table on page 15. For example, if digits 1243 are dialed relays A1, B2, C3 and D4 are operated and contacts A1-6, B2-6, C3-6 and D4-6 are closed. Consequently, leads A, B, C and D are connected to leads 1, 2, 3 and 4. The A, B, C and D leads are opened in the trunk circuit FIG. 4 at contacts TC1-1 until connection has been established by the Common Control Circuit. When preference has been established in the Preference Circuit, to be described later, relay TC1 will be energized by the Common Control Circuit to close contacts TC1-1 in the trunk circuit to connect leads A, B, C and D to the Tone Generator Circuit.

When the code has been transmitted the LK lead will be opened, as mentioned previously, releasing all relays which have locked operated in the register circuit.

NUMBER CHECKING CIRCUIT—SECTION 3— FIGS. 6, 7, 8 AND 9

When any trunk circuit has a complete four digit number stored, the CST lead, FIG. 4, is grounded by the operation of relay TC which is operated by the register circuit. The grounded CST lead starts the operation of the Preference Circuit as mentioned previously and as will be described fully in the following section. When the trunk has been found by the Preference Circuit the Common Control Circuit provides a ground on lead MST FIG. 6. The ground on lead MST operates relay MST in the number checking circuit through closed contacts RJ-1, SC-1, SB-1 and SA-1.

Figure 6:
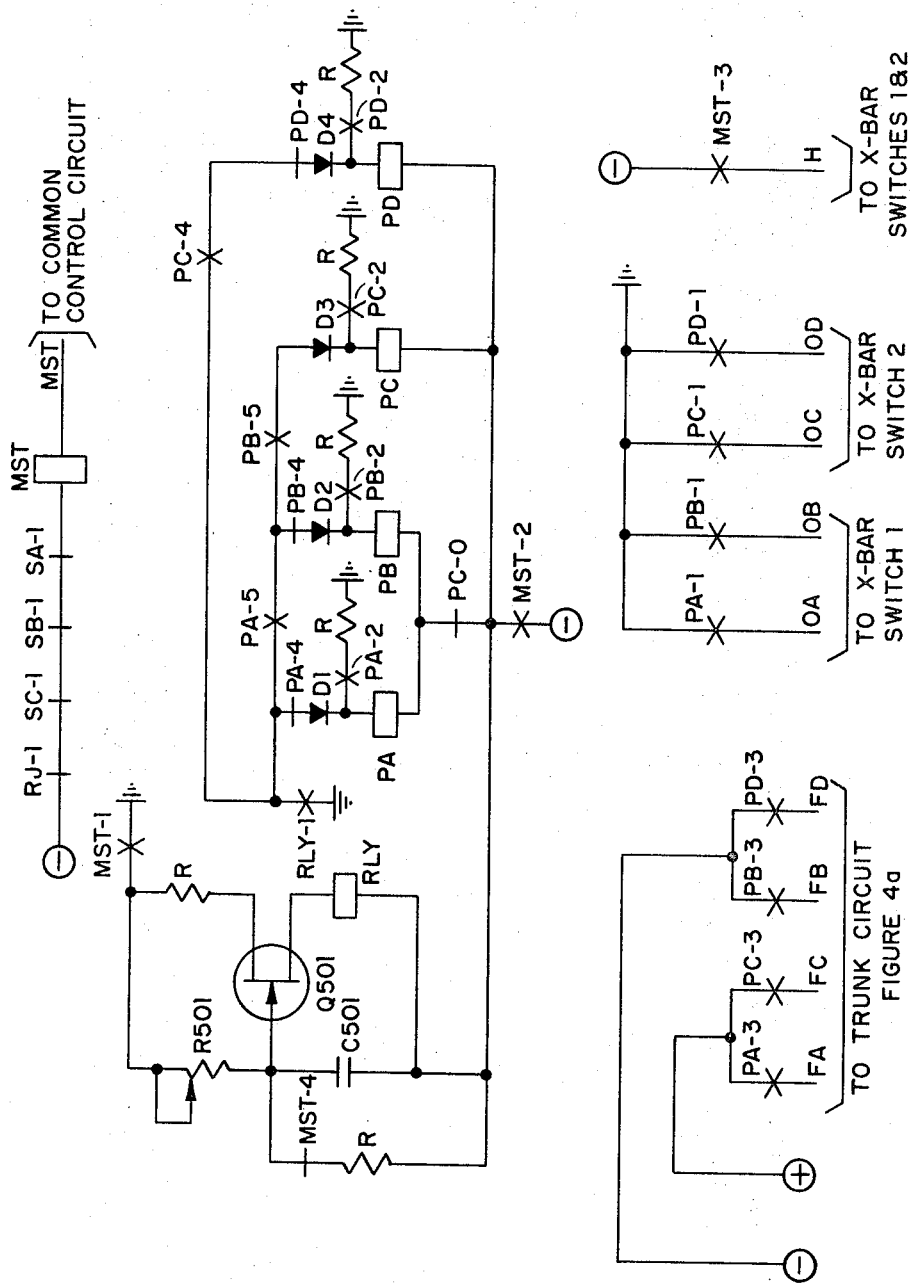
FIGS. 6 through 9 illustrate the number checking circuit.

The operation of relay MST connects ground and battery to unijunction transistor oscillator Q501 FIG. 6 through contacts MST-1 and MST-2 respectively and removes the shunt around capacitor C501 through contacts MST-4. The operation of relay MST also connects battery to lead H of the crossbar switches #1 and #2 in FIGS. 7 and 8 through contacts MST-3. The unijunction transistor operates in a manner known in the art to generate a series of pulses the shape and spacing of which are controlled by resistor R-501 and capacitor C-501.

The first pulse generated by oscillator Q501 operates relay RLY which closes contacts RLY-1 to operate relay PA through normally closed contacts PA-4, diode D1, normally closed contacts PC-0 and closed contacts MST-2. The operation of relay PA closes contacts PA-1 and provides ground to lead OA of crossbar switch #1 FIG. 7. Relay PA locks operated through its own contacts PA-2 under the control of contacts PC-0 of relay PC. Relay PA also closes contacts PA-3 and provides a positive potential source to lead FA of the trunk circuit FIG. 4. The positive potential is routed over the register circuit contacts of relays A1-A6 to the coils of crossbar switch #1. The polarity of diodes D1-D20 in series with the windings of these coils is such that only the vertical magnets S1-S0 of the switch could be operated. Consequently, a vertical magnet of switch #1 corresponding numerically to the first digit which was stored in the register circuit operates.

The second pulse from pulse generator Q501 operates relay PB through now closed contacts PA-5 of relay PA.

Figure 7:
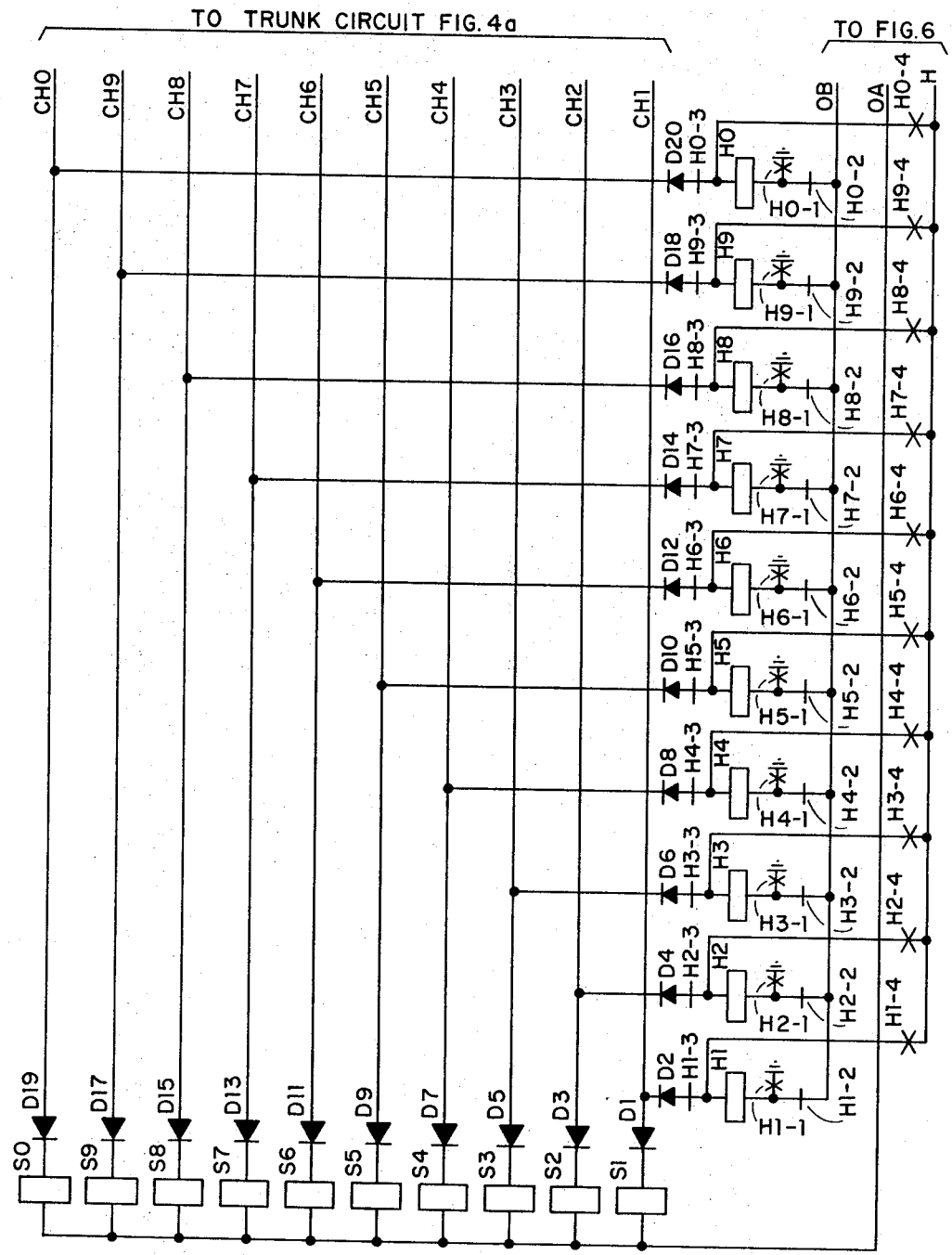
Figure 8:
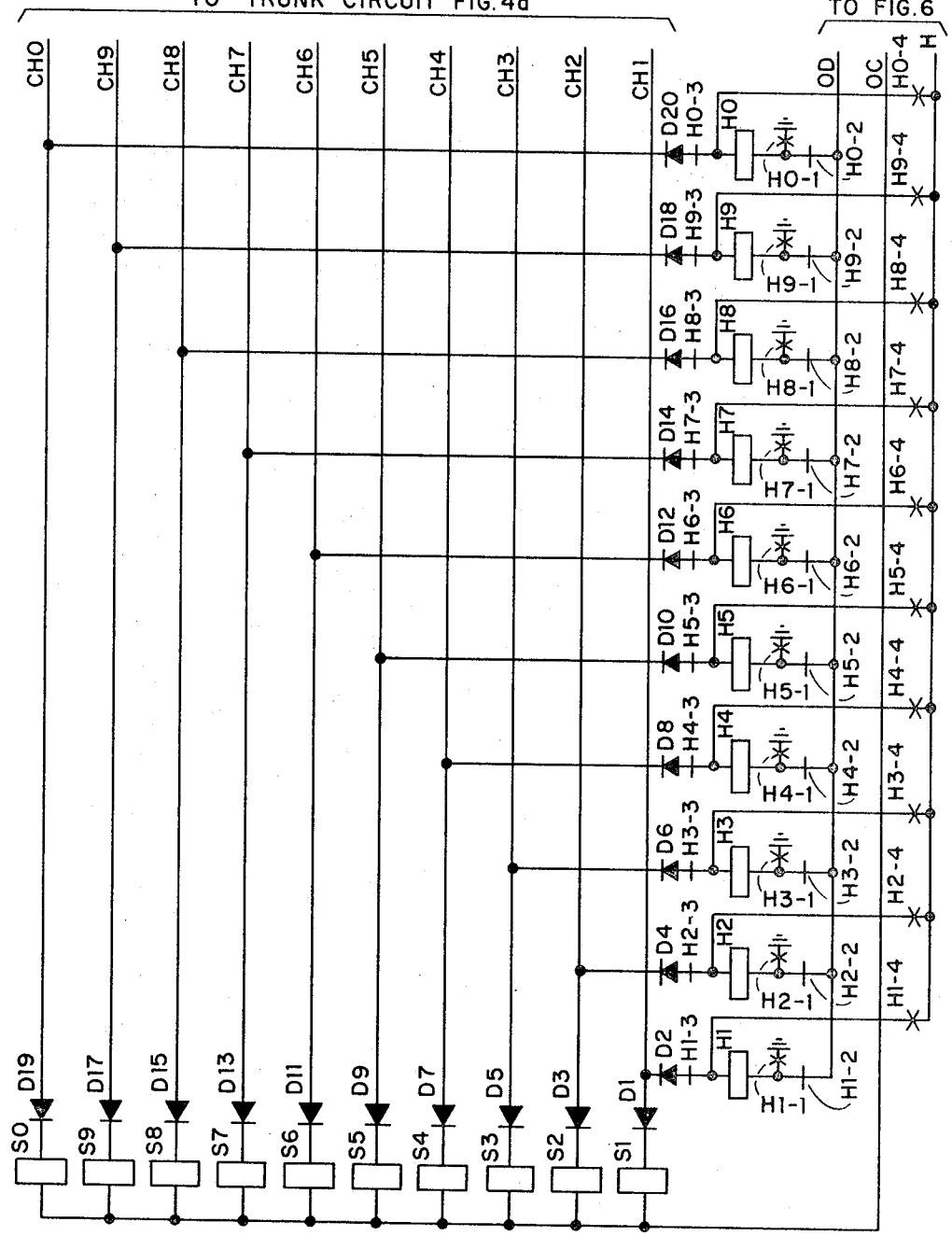

The operation of relay PB closes contacts PB-1 and applies ground on lead OB of switch #1 FIG. 7. Relay PB locks operated through its own contacts PB-2. The operation of relay PB also provides a negative potential source through contacts PB-3 to lead FB going to the trunk circuit. The negative potential will be routed over the contacts of relays B1-B6 of the register circuit to the coils of crossbar switch #1. The polarity of the diodes D1-D20 in series with each coil is now such that only the horizontal magnets H1-H0 could be operated. Consequently, a horizontal magnet of the first switch corresponding numerically to the second digit stored in the register operates. The crosspoints of crossbar switch #1 corresponding to the first two digits stored in the register lock operated through their own contacts H(1-0)-4 and H(1-0)-1 under the control of contacts MST-3 of relay MST.

The third pulse from oscillator Q501, operates relay PC through contacts PB-5. The operation of relay PC opens contacts PC-0 and releases relays PA and PB. Relay PC locks operated through its own contacts PC-2. Relay PC also provides ground to lead OC for crossbar switch #2 FIG. 8 through contacts PC-1. In addition, relay PC provides a positive potential to lead FC of the trunk circuit through contacts PC-3. The positive potential is routed over contacts of relays C1-C6 of the register circuit to the coils of crossbar switch #2. The polarity of diodes D1-D20 of crossbar switch #2 is such that only the vertical magnets S1-S0 of that switch could be operated. Consequently, the vertical magnet corresponding numerically to the third digit stored in the register circuit is operated.

The fourth pulse from oscillator Q501 operates relay PD through contacts PC-4. Relay PD closes contacts PD-1 and provides a ground to lead OD FIG. 8. Relay PD locks operated through its own contacts PD-2. In addition, relay PD closes contacts PD-3 and provides a negative potential to the FD lead of the trunk circuit. The negative potential is routed over contacts of relays D1-D6 of the register circuit to crossbar switch #2. The polarity of diodes D1-D20 is such that only the horizontal magnets H1-H0 could be operated. Consequently, the horizontal magnet corresponding numerically to the digit stored in the register circuit is operated. Crosspoints of crossbar switch #2 which correspond numerically to the third and fourth digits stored in the register circuit lock operated through their own contacts H(1-0)-4 and H(1-0)-1 under the control of contacts MST-3 of relay MST.

Figure 9:
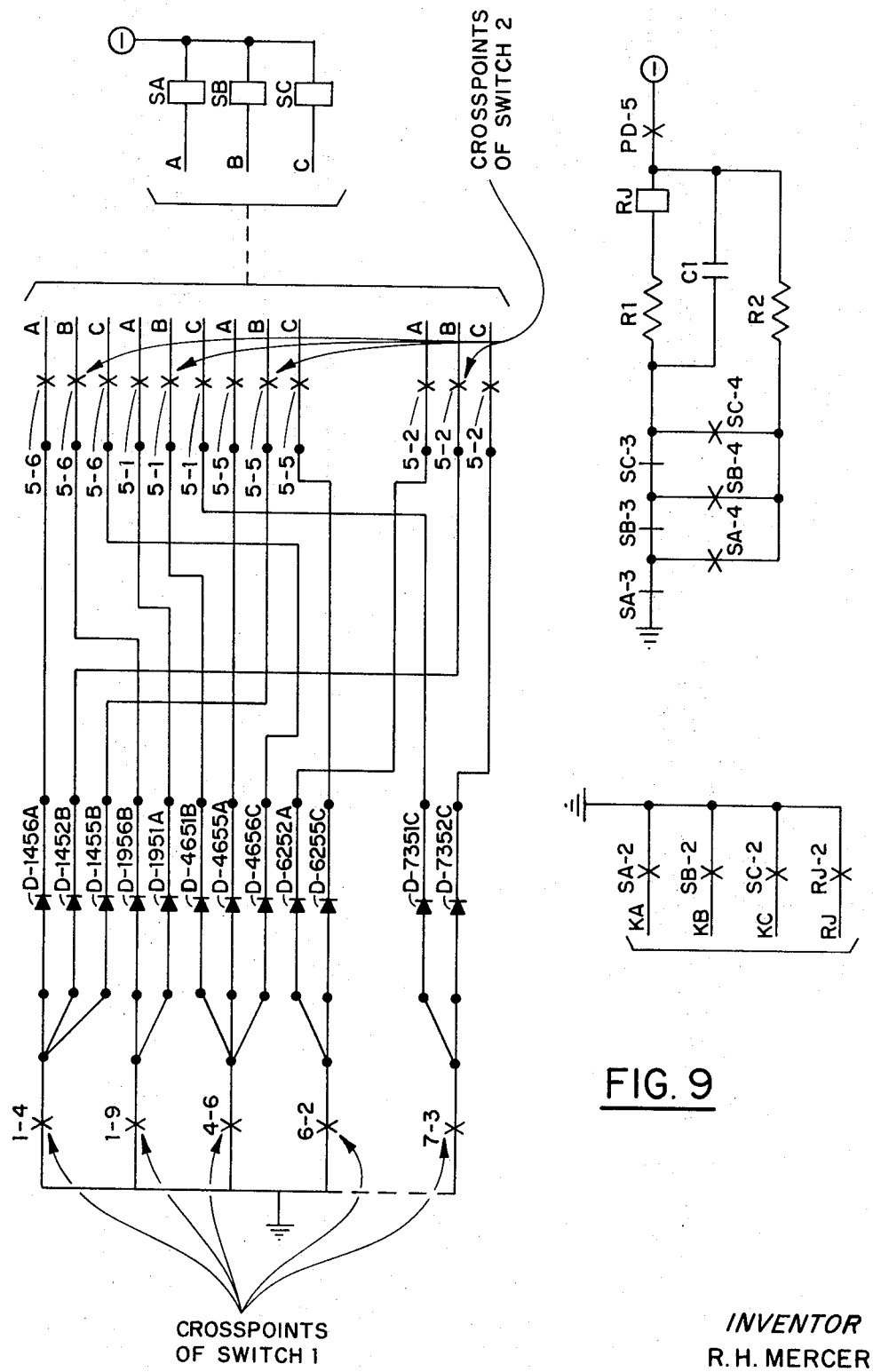
Figure 10:
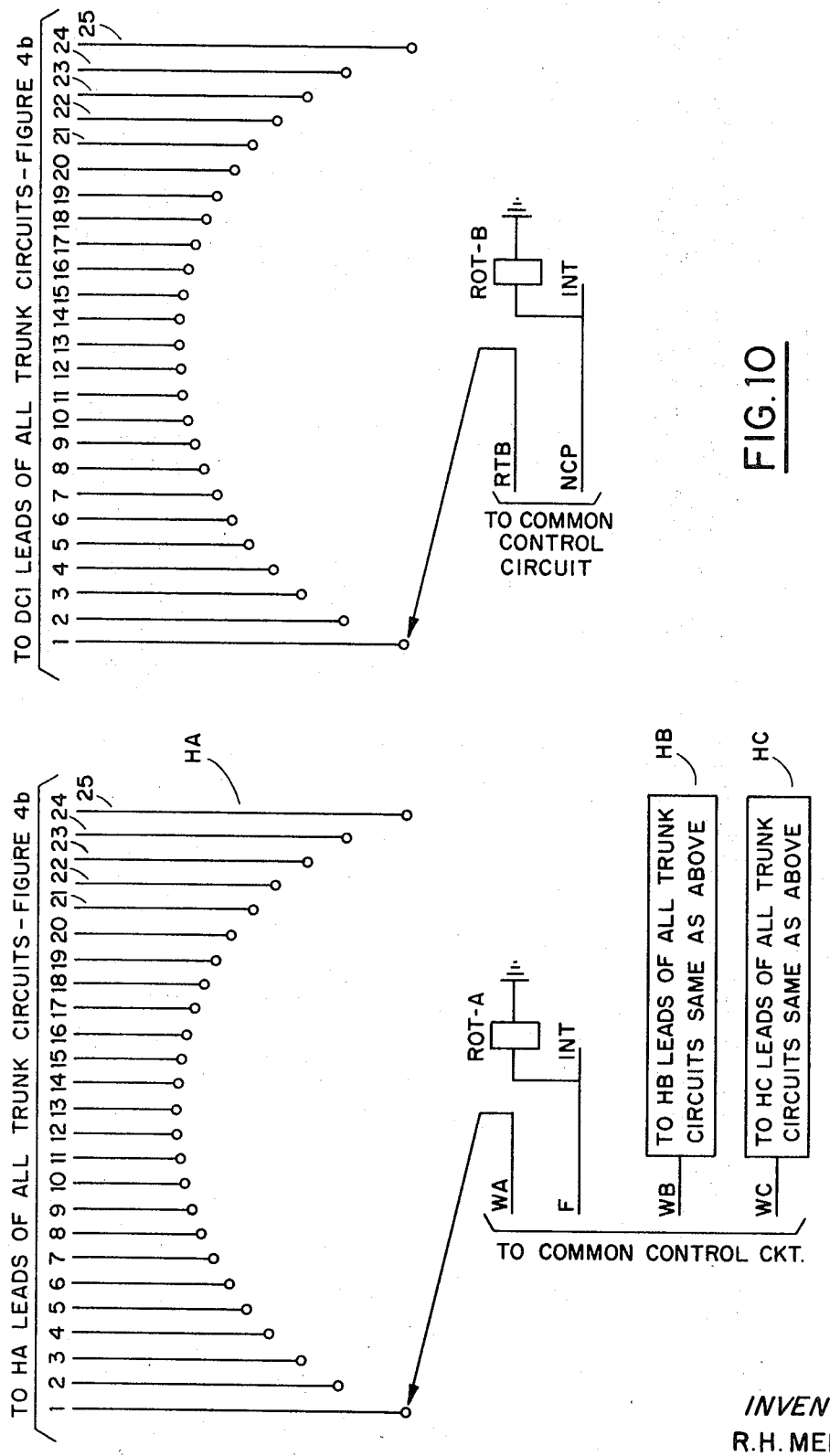
FIG. 10 illustrates the preference circuit.
Figure 11:
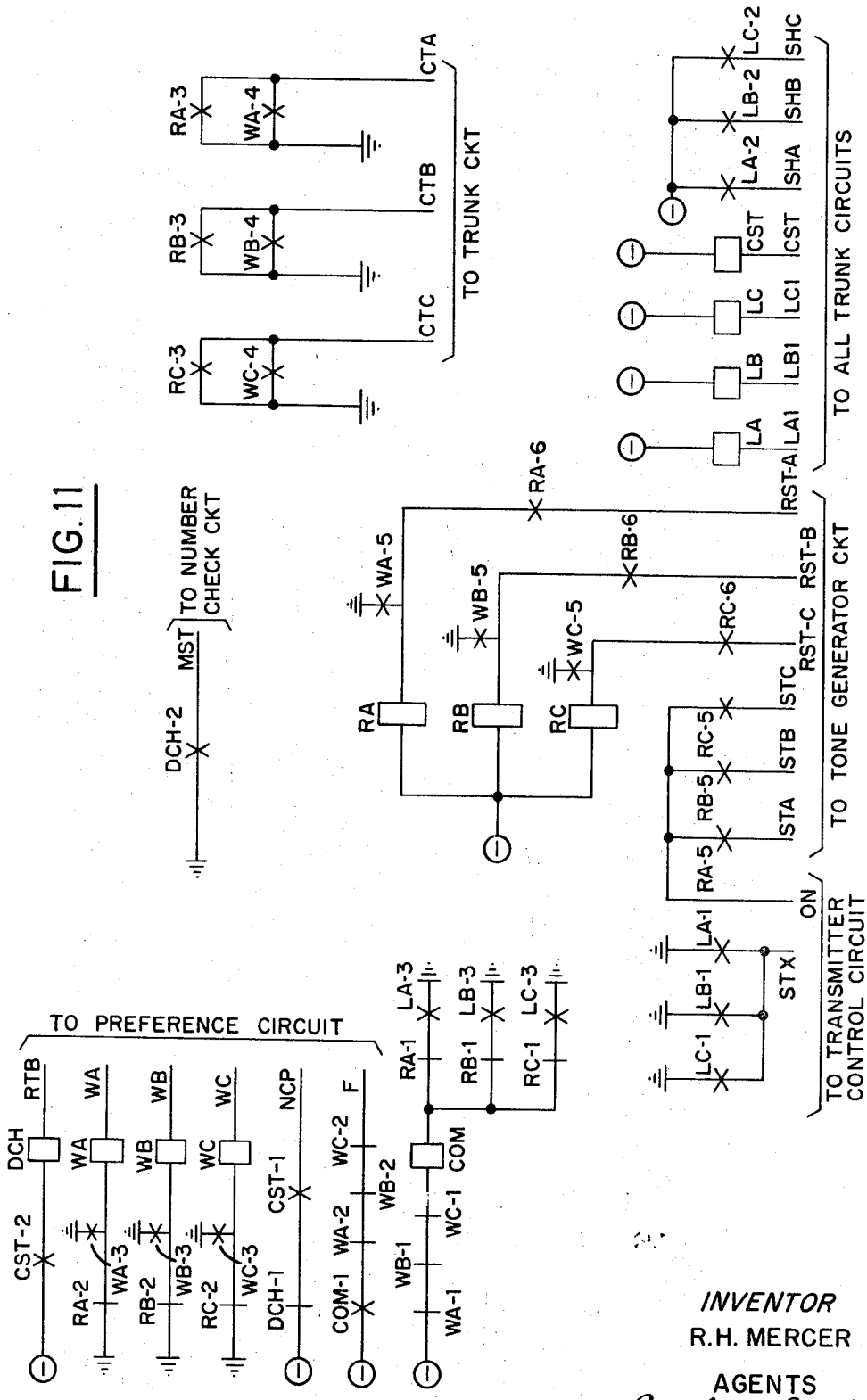
FIG. 11 illustrates the common control circuit.
Figure 12:
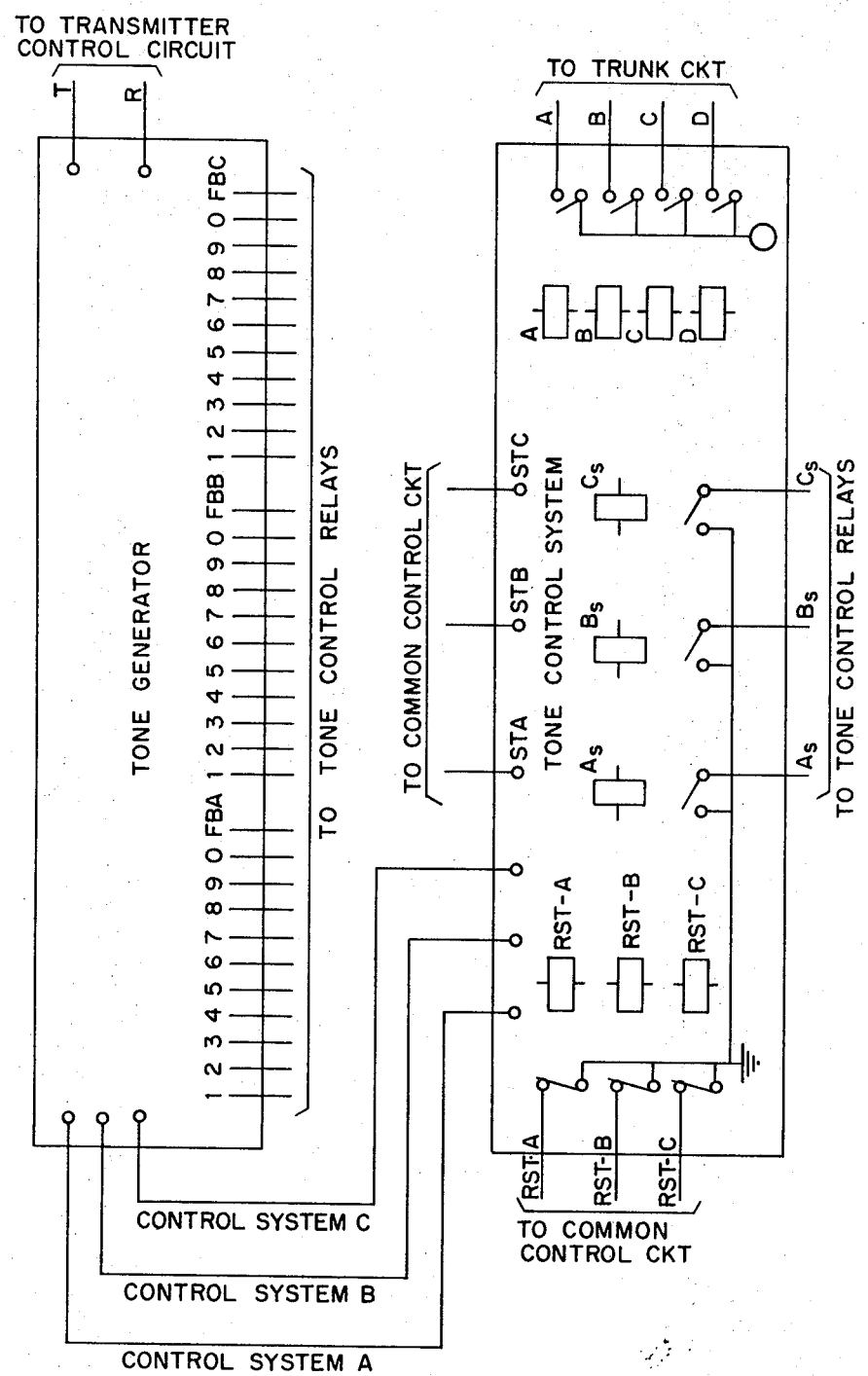
FIG. 12 illustrates schematically the tone generator circuit.
Figure 13:
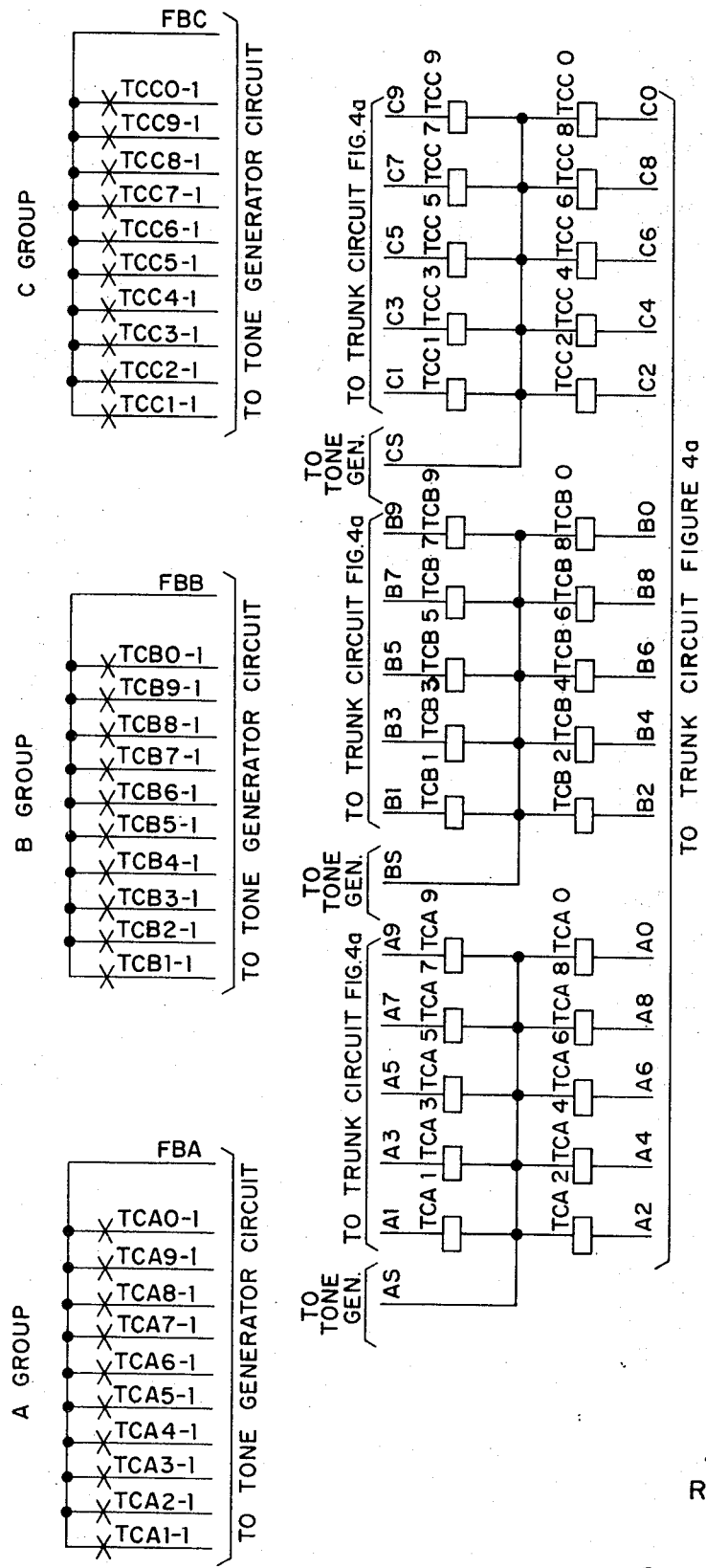
FIG. 13 illustrates the tone control relays.
Figure 14:
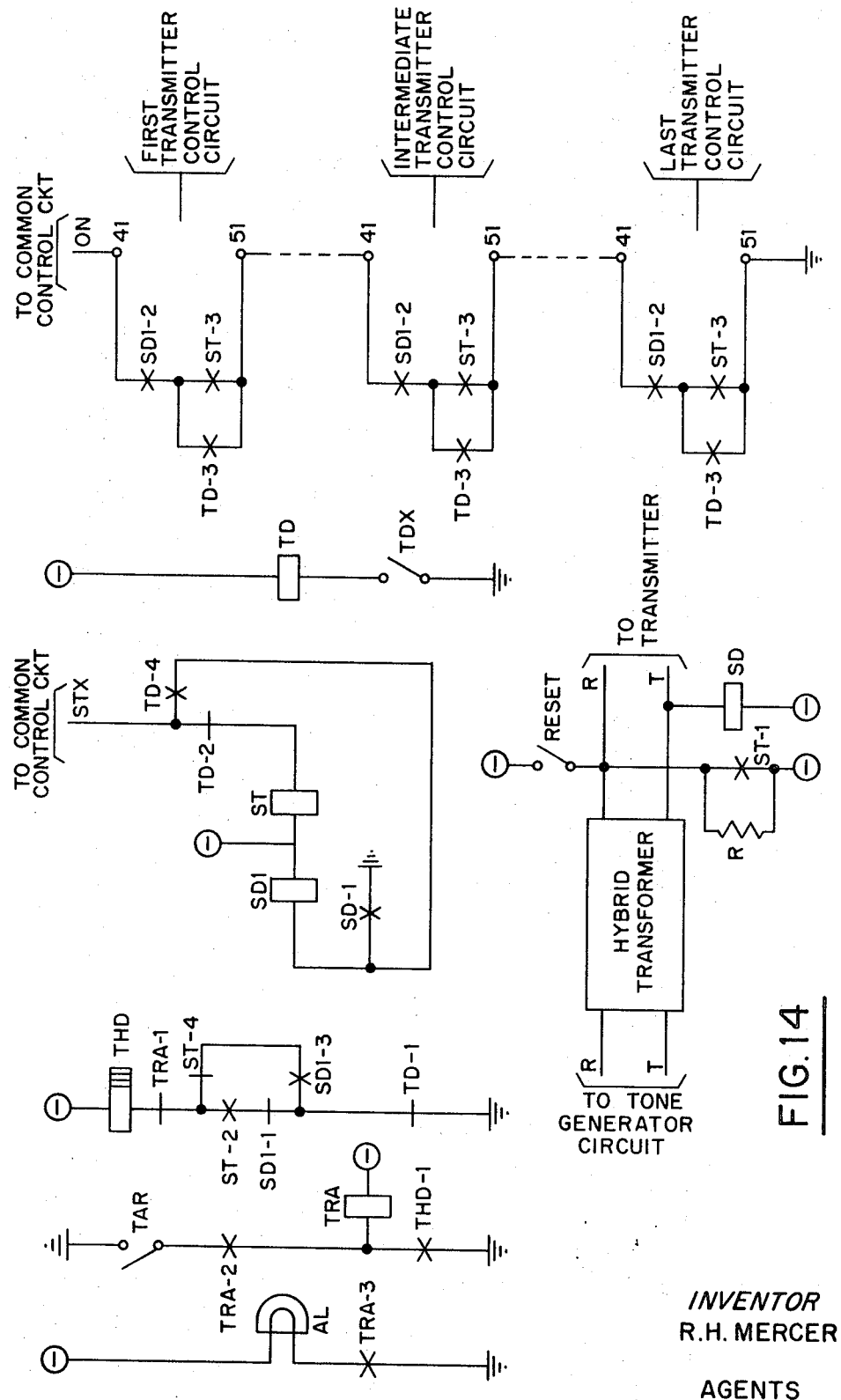
FIG. 14 illustrates the transmitter control circuit.

At this time, crossbar switches #1 and #2 have been set up to correspond with the four digit number stored in the register circuit. If a diode D- is wired between the pair of crosspoints involved such as shown in FIG. 9, a path exists from the input of crossbar #1 and the output of crossbar #2. Switch #2 has three wire crosspoints and depending on which wire has been connected to the D- diode, one of relays SA, SB or SC operates. The operated relay SA, SB or SC closes contacts SA-2, SB-2 or SC-2 and grounds lead KA, KB or KC. The ground on lead KA, KB or KC "marks" the trunk register circuit FIG. 4 as containing a number requiring A, B or C coding. In the system illustrated in FIG. 9, diode D-1456A, for example, has been wired between crosspoints 1-4 and 5-6 corresponding to digits 1456 stored in the register. Since diode D-1456A is connected to wire A of switch #2, relay SA is operated and closes contacts SA-2 to ground lead KA. The ground on lead KA "marks" the trunk register circuit under test as containing a number requiring "A" coding. The operation of relays SA, SB or SC opens contacts SA-1, SB-1 or SC-1 to deenergize relay MST and release the number checking circuit.

Any four digit number which has been stored in a register but for which no diode has been provided (between crossbar #1 and crossbar #2) will not receive such a marking pulse and consequently, will not proceed through the remainder of the system. In this case, none of the relays SA, SB or SC will operate. Relay RJ which is provided with a 75 M.S. delay due to resistor R1 and capacitor C1, will then operate through normally closed contacts SA-3, SB-3 and SC-3 and closed contacts PD-5. The operation of relay RJ ground the RJ lead to the trunk register circuit through contacts RJ-2. Ground on the RJ lead ejects the non-existent number from the trunk register circuit under test as mentioned previously.

A resistor R2 is shunted across capacitor C1 for discharging the capacitor when contacts SA-4, SB-4 or SC-4 are closed, thus restoring the timing circuit of relay RJ.

Similarly a resistor R is shunted across capacitor 501, FIG. 6, for discharging the capacitor when contacts MST-4 are closed thus restoring the timing circuit comprising resistor R501 and capacitor C501.

PREFERENCE CIRCUIT—SECTION 4—FIG. 10

When any trunk register in the system has a four digit number stored, lead CST in the trunk circuit FIG. 4 is grounded and operates relay CST in the Common Control Circuit which will be described in the following section.

The operation of relay CST in the Common Control Circuit provides battery on lead NCP to the rotary switch ROT-B through the intercepter contacts INT of rotary switch ROT-B under the control of contacts DCH-1 of relay DCH to be described later. Battery on the NCP lead causes the rotary switch to step one position to the right with each step. The intercepter contacts break the circuit between lead NCP and the coil of the relay with each step, resulting in a self-stepping action which will continue as long as battery exists on the NCP lead.

The trunk register circuits containing a complete four digit number places a ground in series with trunk circuit relay DC1 as mentioned previously in the description of FIG. 4. Relay DCH in the Common Control Circuit is connected via lead RTB to the wiper of rotary switch ROT-B. When the ROT-B wiper has been stepped to a position corresponding to a trunk register which has stored a complete four digit number, relay DC1 in that trunk circuit and the DCH relay in the Common Control Circuit operate in series.

The operated relay DCH in the Common Control Circuit opens the battery path to the NCP lead thereby stopping rotary switch ROT-B from operating. The operated relay DC1 closes contacts DC1-1 in the trunk circuit to connect the trunk register to the number checking circuit as mentioned previously in the description of FIGS. 4, 5, 6, 7, 8 and 9 to determine in which one of groups A, B or C the number stored in the register circuit belongs.

When the number checking of the trunk is completed, ground will be removed from lead DC1 by the operation of relay B and opening of contacts B-1 in the trunk circuit. This will remove ground from lead RTB and release relay DCH in the Common Control Circuit. If the CST relay in the Common Control Circuit is still operated due to additional trunk circuits containing a complete four digit number, the above will be repeated.

Rotary switch ROT-A in the preference circuit functions in a manner similar to that described for the ROT-B switch. Switch ROT-A, however, is a three bank switch. The three banks are designated HA, HB and HC while their associated wipers are designated WA, WB and WC.

When a four digit number contained in a trunk register circuit has been checked in the number checking circuit and found to exist as an A, B or C group code, the appropriate KA, KB or KC relay in the trunk circuit is operated as explained previously and operates contacts KA-11, KB-11 or KC-11. Relay P in the trunk circuit is connected to leads HA, HB or HC depending on the group in which the number is found to belong.

For the purpose of this description, let us assume that the number belongs to group A. In the common control circuit the winding of relay WA is connected to the wiper WA of rotary switch ROT-A via lead WA. Also relay COM is operated as will be described later. The operated relay COM will, among other functions, provide battery to the ROT-A switch via the F lead and cause the ROT-A rotary switch to hunt. When the WA wiper contacts the HA lead of a trunk circuit in which contacts KA-11 is closed, the WA relay of the common control circuit and the P relay of the particular trunk circuit operate in series. The functions of the P relay have been described in the decription of the trunk circuit. The functions of the WA relay will be described later.

The circuit functions in a similar way if the trunk circuit contains a B or C group code except that common control relays WB or WC instead of WA operate in series with trunk relay P.

The COM relay of the common control circuit is so arranged as to operate and thus keep the ROT-A switch hunting as long as there exists a trunk register circuit containing an A, B or C group number and as long as corresponding RA, RB and RC relays in the common control circuit have not been operated. In this way, the ROT-A switch attempts to select at all times one trunk containing an A group number, one trunk containing a B group number and one trunk containing a C group member.

COMMON CONTROL CIRCUIT—SECTION 5—FIG. 11

When any trunk register circuit has a complete four digit number stored, ground will be placed on the CST lead as described previously to operate common control relay CST. The operation of relay CST connects battery to lead NCP at contacts CST-1 to start the ROT-B relay under the control of contacts DCH-1 of released relay DCH. As mentioned in the description of the preference circuit, ROT-B relay will rotate until it finds the ground on the DC1 lead associated with the trunk register circuit which has a four digit number stored. This ground will operate relay DCH through closed contacts CST-2 of operated relay CST.

The operation of relay DCH opens the energization path to the NCP lead at contacts DCH-1 stopping the rotary switch ROT-B. The operation of relay DCH also closes contacts DCH-2 to the number checking circuit to begin checking the number which has been stored in the trunk register as mentioned in the description of the number checking circuit. When the checking has been completed, the trunk circuit will remove ground on the DC1 lead thereby releasing DCH.

The release of relay DCH opens contacts DCH-2 and deenergizes the MST relay in the number checking circuit. It also reconnects battery at contacts DCH-1 to the NCP lead so that if additional trunk registers have a complete four digit number stored rotary switch ROT-B will operate again, repeating the complete cycle.

When the number contained in any trunk register circuit has been checked in the number checking circuit and found to exist in one of the A, B or C groups, the appropriate KA, KB, or KC relay in that trunk circuit will be operated as explained previously. The KA, KB and KC relays of all trunk circuits are connected in parallel to the LA1, LB1 and LC1 lead respectively in the common control circuit. Consequently, the LA, LB or LC relay operates in series with the selected trunk relay KA, KB or KC.

Let us assume for this description that the trunk in question has received an A "mark" and therefore relay KA in the trunk circuit, and relay LA in the common control circuit are operated. The operated relay LA will ground the STX lead to the transmitter control circuit through contacts LA-1. The operation of relay LA also closes contacts LA-2 to the SHA lead. In addition, it provides ground over normally released contacts WA-1, WB-1, WC-1, RA-1 and closed contacts LA-3 to operate relay COM.

The operated relay COM provides battery through its own contacts COM-1 and normally closed contacts WA- 2, WB–2 and WC–2 to lead F. The battery applied to lead F causes ROT–A rotary switch to rotate. The switch will attempt to find the trunk circuit which has received an A mark as described in the Preference Circuit section of this description. When the wiper arrives at the correct trunk circuit, battery from lead HA in the trunk circuit will operate relay WA under the control of contacts RA–2.

The operation of relay WA will open the F lead at contacts WA–2 stopping the rotary switch. Relay WA locks operated over its own contacts WA–3. In addition, relay WA closes contacts WA–4 to apply ground to the trunk circuit lead CTA. This CTA ground, as explained previously, operates the TC1 relay in the trunk circuit to connect the trunk circuit to the tone generator circuit. Finally, relay WA operates relay RA at contacts WA–5.

Relay RA locks operated to the RST–A lead under control of the tone generator circuit as it will be described later. Relay RA releases relay WA at contacts RA–2 and maintains ground to lead CTA at contacts RA–3. In addition, the operation of relay RA opens the circuit of relay COM at contacts RA–1 to deenergize relay COM. Finally, it provides a connection between the ON lead and the STA leads at contacts RA–5. When all transmitters have been keyed and are ready to accept modulation, ground will be placed on the ON lead by the transmitter control circuit as it will be described in a later section. This ground will be routed via the STA lead to the tone generator starting the generator circuit. When the code has been transmitted the required number of times, the tone generator circuit removes ground from the RST–A lead releasing relay RA as will be explained later.

The release of relay RA removes the STA lead from the tone generator circuit by opening contacts RA–5. It also removes the ground from the CTA lead at contacts RA–3, thereby releasing relay TC1 and resetting the trunk circuit as described previously. In addition, it restores the operate path between the COM relay and ground at contacts RA–1 and LA–3 if other trunks bearing an A group number exists (relay LA would remain operated) and the above cycle will be repeated.

The above circuit functions in a similar manner for B and C group codes except that relays LB, RB and WB or LC, RC and WC will be involved.

TONE GENERATOR CIRCUIT—SECTION 6—
FIG. 12

The tone generator circuit used in the paging system is a commercial item sold by the Bogen Communication Division of Lear Siegler Inc., and is called The Bogen Pagemaster Model TTG–15. It comprises a tone generator which produces thirty different audio tones for use in various combinations as paging codes. The tones are divided into three groups A, B and C, one for each group of subscribers. Group A provides ten tones ranging from 160 to 301 Hz., group B provides ten tones ranging from 315 to 436 Hz., and group C provides ten tones ranging from 450 to 611 Hz. The tone generator is operated by the Tone Control Relays as will be described in a later section. Groups A, B and C each provide one audio burst for each digit to be transmitted with each burst length being approximately 0.3 second, the gap between them being about 0.075 second. The audio bursts appear on lead T and R to the Transmitter Control Circuit also to be disclosed in a following section.

As mentioned previously in the description of the common control circuit, the tone generator circuit begins cycling when a ground is applied to leads STA, STB or STC. The first portion of this cycle places a ground on lead AS to the tone control relays to be described later and also applies battery sequentially on leads A, B, C and D to the trunk circuit, FIG. 4. When all four leads A, B, C and D have been scanned, the tone generator circuit will shift ground from the AS to the BS leads and again apply battery sequentially to leads A, B, C and D. The above operation is finally repeated for lead CS. When the code has been transmitted the required number of times, the tone generator circuit removes ground from lead RST–A, RST–B or RST–C thus releasing the common control circuit relays RA, RB or RC.

TONE CONTROL RELAYS—SECTION 7—FIG. 13

When the Tone Generator Circuit has received a start signal (ground on lead STA, STB or STC) from the common control circuit, it will begin cycling. The first portion of this cycle will place ground on the AS lead which is connected to group A Tone Control Relays. The tone generator circuit will also place battery sequentially on the A, B, C and D leads to the trunk circuits.

One trunk circuit containing an A group code will have been selected by the preference circuit. In this trunk the A, B, C and D leads would be cut through to the associated register by the operated TC1 relay at contacts TC1–1 as explained previously. The output of the register would be connected by selected contacts KA–1 to KA–0 to the leads A1 to A0.

Battery applied on the A lead by the tone generator circuit will be routed over the register circuit contacts A1–A6 to the A lead (A1–A0) which corresponds to the first digit of the number stored in the register circuit. The appropriate A group relay TCA1–TCA0 will operate. The operation of one of relays TCA1–TCA0 operates one of contacts TCA1–1 to TCA1–0 to operate the tone generator circuit so that the audio tone corresponding to the first digit being called is generated.

When the tone generator shifts from the A to the B lead, operation will be similar except that a tone control relay TCB1 to TCB0 will be operated and cause the tone generator to generate a tone required by the second digit being called.

In similar ways the C and D leads will be sequentially connected to control the third and fourth digits of the call.

When all four digits of the call have been transmitted, the tone generator will shift ground from the AS to the BS lead. The above operations will be repeated except that relays from group B of the tone control relay circuit will function in conjunction with a trunk register containing a B group code. The Tone Generator will generate audio tones from group B and a B number will be called.

When all four digits of the B call have been transmitted the tone generator will shift ground from the BS to the CS lead. The above operations will be repeated except that relays of group C of the tone control relay circuit will function with a trunk register containing a C group code and a C number will be called.

TRANSMITTER CONTROL CIRCUIT—SECTION 8—
FIG. 14

When ground is received from the LA relay in the common control circuit over the STX lead, relay ST in all transmitter control circuits operates through contacts TD–2.

The operation of relay ST
 (a) Closes contacts ST–1 and short circuit resistor R to put positive potential on the ring side of the line to key the remote transmitters in a known manner;
 (b) Closes contacts ST–2 and provides a ground to thermal delay relay THD which starts timing;
 (c) Closes partially a loop to terminals 41 and 51 at ST–3.

When the remote transmitter has been keyed, ground is returned over the tip side of the line in a known manner to operate relay SD. Relay SD operates relay SD1 at contacts SD–1.

The operation of relay SD will
 (a) Open contacts SD1–1 and remove ground from relay THD thus interrupting the timing cycle;
 (b) Completes loop to terminals 41 and 51 at contacts SD1–2.

When all transmitters in the group are operated, a ground is looped through terminals 41 and 51 of all transmitter control circuits and is forwarded to the common control circuit terminal lead ON to indicate that the transmitters are ready for modulation.

When the last group of tones has been sent, ground is removed from the STX lead releasing relay ST. The release of relay ST will (a) Open contacts ST-1 and removes the positive potential source from the ring side of the line releasing the remote transmitter;

(b) Close ground to relay THD at contacts ST-4;

(c) Open the loop to terminals 41 and 51 at contacts ST-3.

When the transmitter turns off relay SD releases, releasing relay SD1 at contacts SD-1. The release of relay SD1 will open the operating path of relay THD at contacts SD1-3.

The circuit is restored to normal and ready for further calls.

If the transmitter should fail to come on within 30 seconds of the operation of the ST relay, relay THD will operate through contacts TRA-1, ST-2, SD1-1 and TD-1. The operation of relay THD will operate relay TRA through contacts THD-1.

Relay TRA locks operated through contacts TRA-2 and key TAR and opens the operating path of relay THD at contacts TRA-1. In addition, it provides a ground at contacts TRA-3 to operate alarm light AL to indicate that the transmitter failed to operate.

The alarm may be released by the operation of the TAR key which will release relay TRA and turn off lamp AL at contacts TRA-3.

If any transmitter in a group should fail, it will cause the entire group to be inoperative because a ground will not appear on lead ON. If it is desired to operate the remaining transmitters, a transmitter disable key TDX is operated to energize relay TD.

The operation of relay TD will (a) Open the energizing circuit of relay THD at contacts TD-1;

(b) Remove the STX lead from relay ST at contacts TD-2 and transfer it to relay SD1 through contacts TD-4 to operate relay SD1. The operation of relay SD1 will close contacts SD1-2;

(c) Complete the loop between terminals 41 and 51 at contacts TD-3 thus allowing all other transmitters in the group to proceed.

If the transmitter fails to go off after release of relay ST, relays SD and SD1 will remain operated. Relay SD1 operated and ST released will provide an operating path for relay THD through contacts ST-4 and SD1-3. Relay THD will operate after 30 seconds and cause the operation of relay TRA which will operate alarm light AL at contacts TRA-2.

Operation of the transmitter RESET key applies negative potential to the ring side of the line to reset or turn-off the remote transmitter.

The above disclosed paging system operates as follows:

When a subscriber dials the access code, his call is stored in one of the registers of the trunk circuits. When any trunk circuit has a complete four digit number stored in it, a preference circuit is operated by the common control circuit to find such trunk and to connect it to a number checking circuit. The number checking circuit determines in which group the called subscriber belongs and marks the trunk circuit accordingly. The preference circuit is subsequently operated by the common control circuit to select one trunk from each group of called subscribers.

When a call has been examined by the number checking circuit and found to exist in one of the groups of calling subscribers, the common control circuit keys a number of transmitter control circuits connected to transmitters. When all the transmitters are ready to accept modulation, the transmitter control circuits signal the common control circuit to operate a tone generator circuit.

The tone generator circuit begins cycling and operates various groups of tone control relays in sequence to convert the dial pulses stored in the trunk circuits selected by the preference circuit to corresponding audio tones and for feeding the audio tones to all the transmitters.

What is claimed is:

1. A paging system comprising:
    (a) a plurality of trunk circuits for receiving the dial pulses designated for predetermined groups of subscribers and a like number of register circuits connected to said trunk circuits for storing said pulses;
    (b) a number checking circuit adapted to be connected to said trunk circuits for determining in which group the pulses stored into said register circuits belong and for marking the trunk circuits accordingly;
    (c) a preference circuit comprising a first rotary switch adapted to hunt for any trunk having a complete number stored in it and for connecting it to the number checking circuit, and a second rotary switch having as many banks as there are of said groups, each bank being adapted to select one trunk from each group;
    (d) a tone generator circuit including tone generators for generating audio tones;
    (e) a number of transmitting means connected to said tone generator circuit for transmitting said audio tones;
    (f) a common control circuit for energizing said preference circuit to hunt for said trunk having a complete number in it and to select said one trunk from each group of subscribers, for keying said transmitting means when a number contained in a register circuit has been checked by the number checking circuit and found to exist in one of the various groups of subscribers, and for turning on the tone generator circuit when all the transmitting means have been keyed; and
    (g) groups of tone control relays adapted to be connected to said selected register circuit and responsive to said tone generator circuit for energizing said tone generators to convert the dial pulses stored in the register circuit of each selected trunk to corresponding audio tones, said groups of tone control relays being energized successively by said tone generator circuit to transmit each group of audio tones in consecutive order.

2. A paging system as defined in claim 1 wherein said trunk circuit comprises a line relay which operates and releases on each pulse to cause the digits dialed to be stored in the register circuit and a trunk circuit relay which is operated by the register circuit when all the digits of a number have been dialed to signal the first rotary switch of the preference circuit to locate the trunk which has a complete number stored in it.

3. A paging system as defined in claim 2 wherein said trunk circuit further includes a relay which is operated by said preference circuit upon location of such trunk to connect the number checking circuit to the register circuit of that trunk so as to determine in which group the particular number stored in the register belongs.

4. A paging system as defined in claim 1 wherein said number checking circuit comprises:
    (a) a first and a second crossbar switch each having vertical and horizontal magnets;
    (b) means for operating the vertical and horizontal magnets of said first crossbar switch in accordance with the first and second digit respectively stored in the register circuit thus closing the crosspoints of the first crossbar switch corresponding to the first two digits stored;
    (c) means for operating the vertical and horizontal magnets of said second crossbar switch in accordance with the third and fourth digits respectively stored in the register circuit thus closing the crosspoints corresponding to the third and fourth digits stored;

(d) a number of first relays coresponding to the number of groups of subscribers; and (e) means for connecting predetermined crosspoints of said first and second crossbar switches in series with predetermined ones of said relays in accordance with the complete four digit number and group of each subscriber whereby the energization of a predetermined one of the relays will determine the group of the subscriber.

5. A paging system as defined in claim 3 wherein each trunk circuit includes means for disconnecting the number checking circuit when the number checking of the trunk is completed so as to render the number checking circuit free to check other register circuits having a complete number stored in them.

6. A paging system as defined in claim 4 wherein the number checking circuit also includes means for releasing the trunk circuit when the number stored in the register circuit is found to be non-existent by the number checking circuit.

7. A paging system as defined in claim 4 wherein said trunk circuit further comprises a second relay for each predetermined group of subscribers said second relays being operated by the corresponding relays of the number checking circuit.

8. A paging system as defined in claim 7 wherein said last-mentioned relays direct the register circuit of that trunk to the appropriate group of tone control relays.

9. A paging system as defined in claim 8 wherein each trunk circuit includes a second trunk circuit relay which is energized by the common control circuit when the second rotary switch has located the selected trunk for connecting the tone generator circuit to the appropriate group of tone control relays through the register circuit and the contacts of the last-mentioned relays.

10. A paging system as defined in claim 8 wherein said register circuit includes four groups of storage relays, at least one relay in each group being operated for each digit stored in the register circuit, and wherein the tone generator circuit is adapted to be connected to said tone control relays through contacts of said storage relays.

11. A paging system as defined in claim 1 wherein each transmitting means includes a transmitter control circuit and a transmitter connected thereto and wherein said common control circuit includes means for keying each transmitter control circuit when a number contained in any register circuit has been checked in the number checking circuit and found to exist in one of the various groups of subscribers.

12. A paging system as defined in claim 11 wherein each transmitter control circuit includes means for signalling the common control circuit when all the transmitters are ready for operation.

13. A paging system as defined in claim 12 wherein each transmitter control circuit includes means for disabling a faulty transmitter and for allowing all other transmitters to operate.

14. A paging system as defined in claim 9 wherein said second rotary switch energizes relay means in the common control circuit to cause operation of the second trunk relay in the selected trunk circuit for connecting the tone generator circuit to the appropriate tone control relays in each group.

15. A paging system as defined in claim 14 wherein said relay means operate the tone generator circuit to sequentially energize said groups of tone control relays.

16. A paging system as defined in claim 15 wherein said tone generator circuit includes means for deenergizing said relay means to release the second trunk relay when the audio tones have been transmitted, the deenergization of the second trunk relay causing the restoration of the trunk and register circuits.

No references cited.

KATHLEEN H. CLAFFY, Primary Examiner

T. L. KUNDERT, Assistant Examiner

U.S. Cl. X.R.

179—18